Feb. 20, 1951     P. F. ALEXANDER     2,542,448
TRACTOR HITCH
Filed Nov. 16, 1948
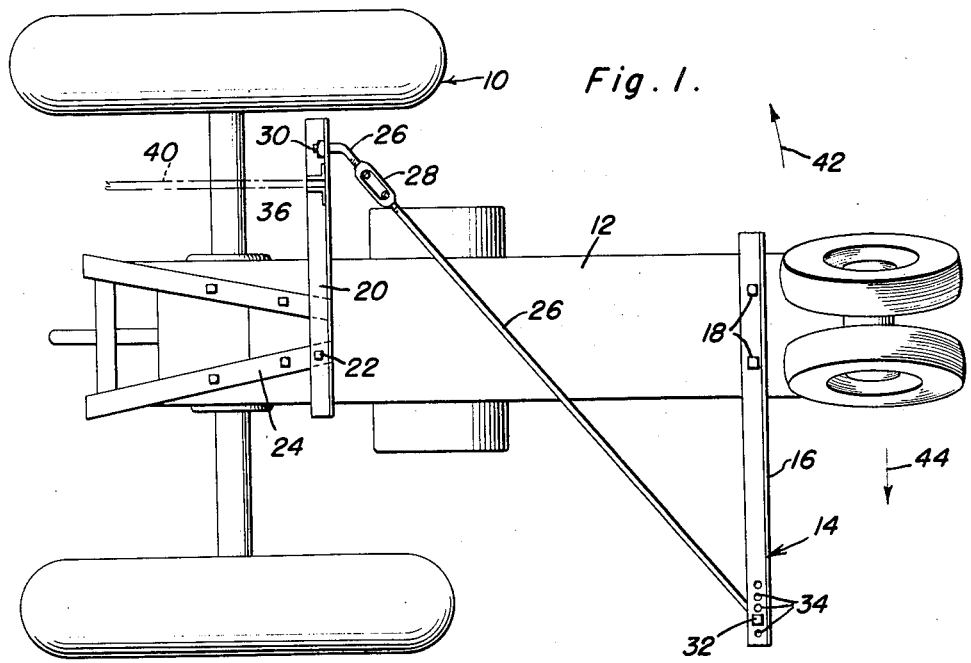
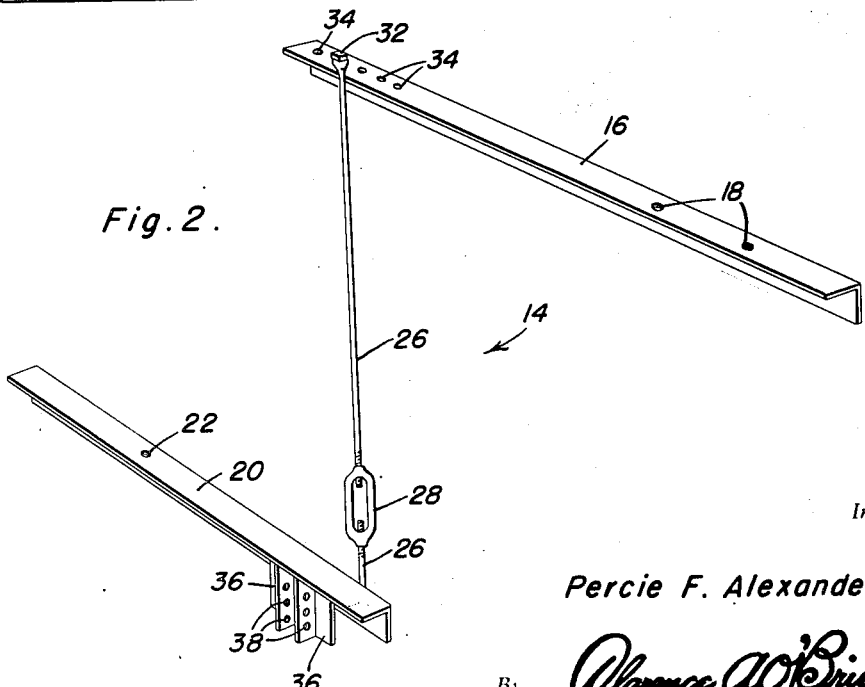
Inventor
Percie F. Alexander Patented Feb. 20, 1951

2,542,448

UNITED STATES PATENT OFFICE 2,542,448

TRACTOR HITCH

Percie F. Alexander, Corning, Kans.

Application November 16, 1948, Serial No. 60,212

1 Claim. (Cl. 280—33.44)

This invention relates to new and useful improvements and structural refinements in hitches for tractors, and the principal object of the invention is to facilitate hitching of various farming implements to a tractor in such manner as to substantially minimize if not completely eliminate the usual "side draft" which is present when an implement such as a plow is hitched to a tractor in the conventional manner This object is achieved by the provision of a hitch which distributes the drawing torque more-or-less equally on both sides of the tractor, so that side draft in the implement does not occur.

An important feature of the invention, therefore, resides in the specific structural arrangement of the hitch, and a further feature thereof involves the provision of means for adjusting the hitch in accordance with given working conditions.

Some of the advantages of the invention lie in its simplicity of construction, in its adaptability to use on tractors of various types, and in its adaptability to economical manufacture.

With the above more important objects and features in view and such other objects and features as may become apparent as this specification proceeds, the invention consists essentially of the arrangement and construction of parts as illustrated in the accompanying drawings, in which:

Figure 1 is an underside plan view of a tractor showing the invention in situ thereon, and Figure 2 is a perspective view of the invention per se.

Like characters of reference are employed to designate like parts in the specification and throughout the several views.

Referring now to the accompanying drawings in detail, the general reference character 10 designates a conventional tractor including an elongated frame 12, and the invention consists of a hitch designated generally by the reference character 14. This hitch embodies in its construction what may be called a torque bar 16, one end portion of which is rigidly secured as at 18 to the forward end portion of the tractor frame 12, the bar 16 projecting laterally to one side of the frame, substantially as shown.

A draw bar 20 is pivotally attached at one end portion thereof as at 22 to the rear end portion of the tractor frame 12, or alternatively, to the conventional hitching frame 24 with which the tractor is commonly provided, but in any event it is to be noted that the draw bar 20 projects laterally to the relatively opposite side of the tractor frame with respect to the torque bar 16.

A tie rod 26, longitudinally adjustable by means of a buckle 28, is connected at the ends thereof as at 30 and 32 to the outer end portions of the respective bars 20, 16, the tie rod 26 extending diagonally under the tractor frame 12. If desired, the connection 32 of the tie rod 26 to the torque bar 16 may be adjusted by virtue of the provision of a plurality of apertures 34 in the outer end portion of the torque bar 16, in which apertures the connection 32 may be selectively inserted.

The outer end portion of the draw bar 20 is equipped with a pair of spaced, downwardly extending brackets 36, which, in turn, are formed with sets of transversely aligned apertures 38 so that a draft member 40 of an implement may be connected to the draw bar 20, as will be clearly apparent. The several apertures 38 facilitate connection of the draft member 40 to the draw bar 20 at the appropriate level at which the draft member of the implement is disposed.

When the invention is placed in use, the draft member 40 of the implement is connected to the draw bar 20 as has been already explained, and since this connection is made at a point which is offset laterally to one side of the tractor frame, a tendency would normally exist to divert the tractor to that side, as indicated at 42 in Figure 1, thus creating a corresponding side drag on the implement. However, since the draw bar 20 is pivoted to the tractor frame, the force acting in the direction of the arrow 42 will be transmitted by the diagonal tie rod 26 to the rigidly secured torque bar 16, thus creating a counteracting force in the direction of the arrow 44. Accordingly, these counteracting forces minimize or completely eliminate each other, so that the tractor may travel in a straight line without creating a side draft or drag in the drawn implement.

Needless to say, by virtue of the turn buckle 28 and the adjusting means 32, 34, the hitch may be adjusted in accordance with given working conditions, depending upon the nature of the work and the type of implement which is being drawn by the tractor.

It is believed that the advantages and use of the invention will be clearly understood from the foregoing disclosure and accordingly, further description thereof at this point is deemed unnecessary.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

In combination with a tractor including an elongated frame having front and rear ends, a hitch comprising a torque bar having one end portion thereof rigidly secured to the front end portion of said frame and projecting laterally to one side of the tractor, the outer end portion of said torque bar being provided with a row of apertures, a draw bar having one end portion thereof pivotally connected to the rear end portion of said frame and projecting to the relatively opposite side of the tractor, a tie rod extending diagonally under said frame and having its rear end connected to the outer end portion of said draw bar, a fastening element provided at the front end of said tie rod and receivable selectively in said apertures, a turnbuckle provided intermediate the ends of the tie rod for shortening and lengthening the same, and a pair of spaced brackets secured to the outer end portion of said draw bar and extending downwardly therefrom, said brackets being provided with vertical rows of openings to receive a hitching pin.

PERCIE F. ALEXANDER.

REFERENCES CITED

The following references are of record in the file of this patent:

UNITED STATES PATENTS

| Number | Name | Date |
|---|---|---|
| 1,440,039 | Vossbeck et al. | Dec. 26, 1922 |
| 1,655,564 | Rees | Jan. 10, 1928 |
| 1,693,673 | Sether | Dec. 4, 1928 |